United States Patent

Green et al.

Patent Number: 5,264,500
Date of Patent: Nov. 23, 1993

[54] APT RESINS

[75] Inventors: George D. Green, Park Ridge; William B. Bedwell, Chicago; Raymond J. Swedo, Mt. Prospect, all of Ill.

[73] Assignee: Allied-Signal Inc., Morris Township, Morris County, N.J.

[21] Appl. No.: 737,737

[22] Filed: Jul. 30, 1991

[51] Int. Cl.$^5$ .................. C08G 8/28; C08L 61/06
[52] U.S. Cl. .................. 525/480; 525/501; 525/502; 525/504; 528/142; 528/146; 528/162
[58] Field of Search .......... 525/504, 480, 491, 164, 525/485; 528/154, 165

[56] References Cited

U.S. PATENT DOCUMENTS

| | | | |
|---|---|---|---|
| 3,448,079 | 6/1969 | Grigat | 260/59 |
| 3,553,244 | 1/1971 | Grigat | 260/453 |
| 4,195,132 | 3/1980 | Sundermann et al. | 521/155 |
| 4,368,298 | 1/1983 | Okayama et al. | 525/480 |
| 4,474,929 | 10/1984 | Schrader | 525/482 |
| 4,612,359 | 9/1986 | Hefner, Jr. | 528/97 |
| 4,650,838 | 3/1987 | Das et al. | 525/504 |
| 4,713,442 | 12/1987 | Woo et al. | 528/422 |
| 4,748,270 | 5/1988 | Murray et al. | 560/301 |
| 4,831,086 | 5/1989 | Das et al. | 525/504 |
| 5,109,078 | 4/1992 | Das et al. | 525/504 |
| 5,137,989 | 8/1992 | Das | 525/504 |

FOREIGN PATENT DOCUMENTS 2283713 11/1990 Japan .................. 528/98

OTHER PUBLICATIONS

Ninigawa et al., "The Reaction Products of Diphenyl Ether with Formaldehyde", 1968, An: CA69(17):670-38-(Chemical Abstracts Indexing only) Makromol. Chem. 116, 270-9.
"Handbook of Epoxy Resins", McGraw-Hill, 1967 (Glycydal Ethers of Novolac Resins) pp. 2-10-2-12.
Saunders, K. J., "Organic Polymer Chemistry" 2nd Edition 1988 Chapman Hall, London pp. 327-330.

Primary Examiner—James J. Seidleck
Assistant Examiner—Patrick R. Delaney
Attorney, Agent, or Firm—Harold N. Wells; Mary Jo Boldingh; Gerhard H. Fuchs

[57] ABSTRACT

A thermosetting resin designated a "APT" resin is produced by a two-step procedure in which a substituted aromatic compound, preferably diphenyl ether is reacted with formaldehyde to produce an oligomeric backbone, followed by further reaction with a phenol to provide pendant phenolic groups. Finally, the resulting polymer is cyanated with a cyanogen halide.

3 Claims, 1 Drawing Sheet

O CURED CYANATED APT RESIN WATER UPTAKE
□ CURED CYANATED APT RESIN METHYLENE CHLORIDE UPTAKE
● CURED CYANATED NOVOLAK RESIN WATER UPTAKE
■ CURED CYANATED NOVOLAK RESIN METHYLENE CHLORIDE UPTAKE

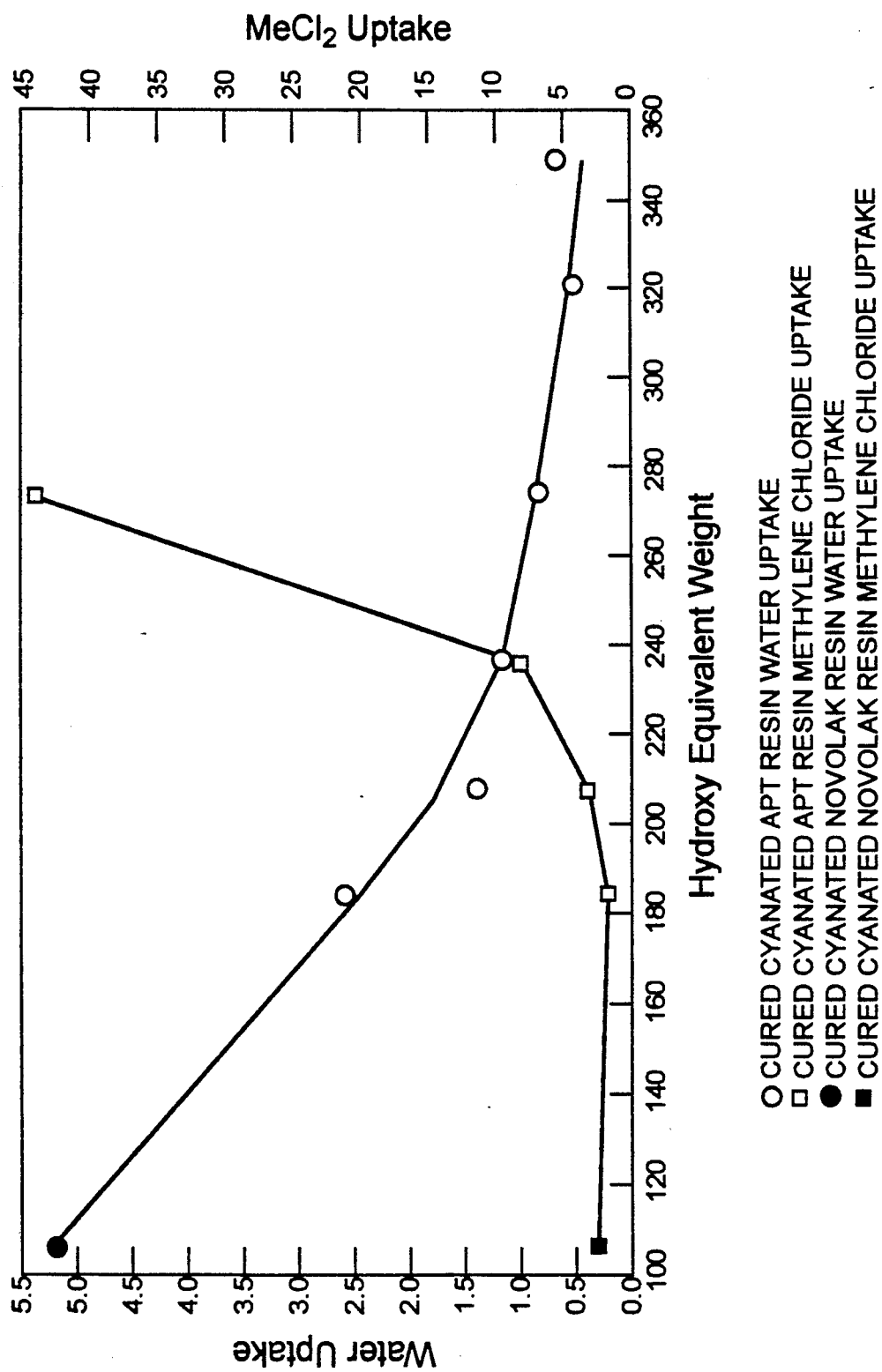

APT RESINS

PRIOR ART

This invention relates to the field of thermosetting resins and in particular, the phenolic triazine resins derived from phenolic cyanate resins. Such resins are well known in the art. Despite interest in these materials their commercial applications have been limited. The present invention relates to improved resins which are related to the phenolic triazines but constitute a new family of resins having similar properties but which should have broader applications.

An improved conventional phenolic cyanate resin is the subject of U.S. Pat. No. 4,831,086. Such materials are made by reaction of a cyanogen halide with a novolak which is a phenol-formaldehyde polymer, i.e., a chain of phenolic groups linked through a methylene group derived from the formaldehyde.

One of the earliest patents disclosing such phenolic cyanate resins is U.S. Pat. No. 3,448,079. A novolak was reacted with a cyanogen halide in the presence of a solvent and an amine as an acid acceptor. A broader disclosure may be found in U.S. Pat. No. 3,553,244, in which the phenolic cyanate compounds are defined by the generic formula, $R(O-C\equiv N)_x$ where X is 1 to 3 and R is an aryl radical having many potential substituents.

U.S. Pat. No. 4,195,132 presents another generic formula in which phenolic groups are linked by various possible moieties, including aromatic rings. Similar is U.S. Pat. No. 4,713,442 in which phenolic groups are linked by C7-20 polycyclic aliphatic radicals.

A limitation to the use of phenolic novolaks is the fixed hydroxy equivalent weight of 106, which can be varied a bit by adding substituents to the phenolic ring. However, greater variation in the hydroxy equivalent weight is desirable. We have found that by first preparing a polymer containing no phenolic groups in the backbone and subsequently adding pendant phenolic groups that a family of cyanated resins can be prepared having properties similar to those of previous phenolic triazines, but having significant advantages.

SUMMARY OF THE INVENTION

The resins of the invention have been designated "APT" resins. They may be generally described by the following formula

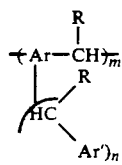

where
R is hydrogen or alkyl having 0-5 carbon atoms,
n/m is 0.1 to 6
Ar is

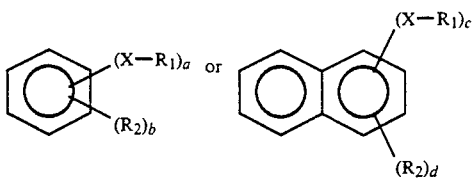

and
X is a sigma bond, O, S, $CH_2$, CO, $SO_2$, $C(CH_3)_2$, or $C(CF_3)_2$
$R_1$ is alkyl, cycloalkyl, phenyl, substituted phenyl, naphthyl, or substituted naphthyl
$R_2$ is hydrogen, alkyl, cycloalkyl, phenyl, substituted phenyl, naphthyl, or substituted naphthyl a is 1-3
b is 0-3
c is 0-4
d is 0-4
$a + b \leq 4$
$c + d \leq 5$ Ar' is

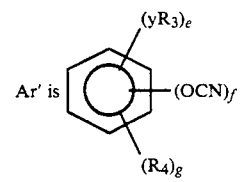

or

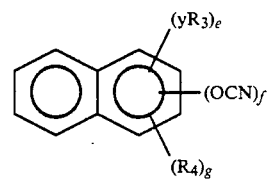

and
y is a sigma bond, $CH_2$, CO, O, S, $SO_2$, $C(CH_3)_2$, or $C(CF_3)_2$
$R_3$ is alkyl, cycloalkyl, phenyl, substituted phenyl, naphthyl, substituted naphthyl, Cl, Br, F, or fluoroalkyl
$R_4$ is hydrogen, alkyl, cycloalkyl, phenyl, substituted phenyl, naphthyl, substituted naphthyl, fluoroalkyl
e is 0-3
f is 1-3
g is 0-3
$e+f+g \leq 4$ The resins are produced by first reacting the aromatic monomer, e.g., diphenyl ether, with aqueous formaldehyde in the presence of a limited amount of a solvent and a strong acid catalyst, preferably sulfuric acid. Thereafter, the product of the reaction is thereafter further reacted with a phenolic moiety to form a polymer having for each aromatic monomer, 1.1 to 7 mols of formaldehyde, and 0.1 to 6 mol of the phenol. The relative amounts of the three components will be varied to provide the desired physical properties. The initial reaction is carried out at a temperature of about 25° C. to 100° C. and the second stage is carried out at about 100° C.

After separation and purification of the resin is complete, it is reacted with a cyanogen halide, preferably the chloride or bromide, in the presence of an acid-accepting amine, preferably triethylamine, and a solvent, preferably methylene chloride or tetrahydrofuran. The reaction is begun at a temperature of about −78° C. to −15° C., preferably about −30° to −40° C. or lower, although a strong exotherm causes the temperature to rise as the reaction proceeds.

After purification of the resin, it may be employed in a manner similar to that of the conventional phenolic cyanate resins.

BRIEF DESCRIPTION OF THE DRAWING

The sole figure illustrates the effect of hydroxy equivalent weight on the solvent absorption of resins of the invention.

DESCRIPTION OF THE PREFERRED EMBODIMENTS

In the following discussion, for convenience only one preferred set of components of the resins of the invention will be used as examples. They will be referred to as diphenyl ether (DPE), formaldehyde (HCHO), and phenol (PhOH). However, it is to be understood that these are only preferred embodiments and that equivalents within the generic formula are included in the scope of the invention:

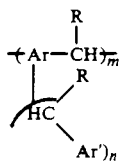

where
R is hydrogen or alkyl having 0–5 carbon atoms, n/m is 0.1 to 6

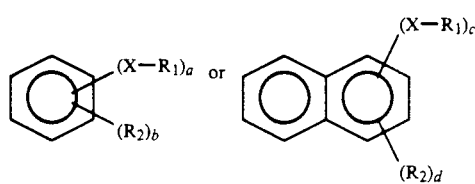

Ar is
and
X is a sigma bond, O, S, CH$_2$, CO, SO$_2$, C(CH$_3$)$_2$, or C(CF$_3$)$_2$
R$_1$ is alkyl, cycloalkyl, phenyl, substituted phenol, naphthyl, or substituted naphthyl hydrogen
R$_2$ is hydrogen alkyl, cycloalkyl, phenyl, substituted phenol, naphthyl, or substituted naphthyl a is 1–3
b is 0–3
c is 0–4
d is 0–4
a + b ≦ 4
c + d ≦ 5

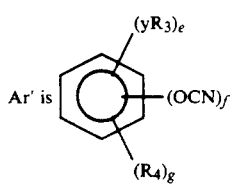

or

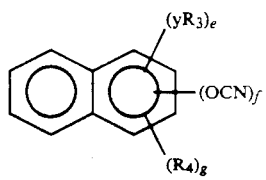

and
y is a sigma bond, CH$_2$, CO, O, S, SO$_2$, C(CH$_3$)$_2$, or C(CF$_3$)$_2$
R$_3$ is alkyl, cycloalkyl, phenyl, substituted phenyl, naphthyl, substituted naphthyl, Cl, Br, F, or fluoroalkyl
R$_4$ is hydrogen, alkyl, cycloalkyl, phenyl, substituted phenyl, naphthyl, substituted naphthyl, fluoroalkyl
e is 0–3
f is 1–3
g is 0–3
e+f+g ≦4

In addition to the preferred diphenylether, other aromatic monomers of partcular interest include xylene, naphthalene, and diphenylmethane. Formaldehyde may be replaced by paraformaldehyde, or monoaldehydes, such as acetaldehyde, propionaldehyde, butyraldehyde, and the like which react with the aromatic compound and permit the subsequent reaction with a phenol to produce a phenolic pendant polymer. While phenol is preferred, substituted phenols may also be used such as bisphenol A, catechol, thiophenol, naphthol, biphenol, 2-chlorophenol, methoxy phenol,

Preparation of DPE/HCHO

It has been found that the reaction of the three components of the resins of the invention must be done sequentially. That is, the copolymerization of the aromatic compound, e.g. DPE with formaldehyde must be done first since the reaction is much slower than the reaction between formaldehyde and phenol. Attempts to react all three components together produced an insoluble product which was useless as a cyanate resin, as will be seen in Example 2 below.

The DPE-formaldehyde reaction preferably is carried out in the presence of a solvent. Depending on the amount and type of solvent and the characteristics of the aromatic compound being reacted with formaldehyde the reaction mixture may be a one or a two-phase system. When there are two phases they are continually mixed during the reaction, but may be separated after the reaction has been completed to remove the water and acid as one phase and the DPE/HCHO reaction product in the solvent as a second phase. When there is only a single phase, it may be necessary to use water to separate the products. The reaction may be carried out in a single vessel, the copolymerization is completed and then without separating phases phenol is added to form a polymer having pendant phenolic groups in the second reaction.

Useful solvents are the aliphatic acids having up to 6 carbon atoms, preferably acetic acid. Alternatively, an excess of the aromatic monomer could be used.

The reaction is carried out at atmospheric pressure, although elevated pressures could be used if desired.

The temperature should be within the range of 25° C. to 200° C., preferably 100° C.

The reaction of DPE/HCHO is carried out using a strong acid catalyst, preferably sulfuric acid. Other acids which may be useful are methane sulfonic acid, p-toluene sulfonic acid, trifluromethane sulfonic acid, acrylamidomethylpropane sulfonic acid, hydrofluoric acid, Lewis acids such as boron trifluoride, zinc chloride, and aluminum chloride.

The amount of acid needed may be varied within the range of about 0.1 to 50 wt. % based on aromatic monomer. We prefer to use about 20 wt. % when sulfuric acid is selected.

Formaldehyde is used in molar excess compared to the diphenyl ether in order to provide the methylol groups necessary for the subsequent reaction with the phenol. In addition, the molecular weight may be controlled by the ratio of HCHO/DPE and the polymerization time and temperature. Generally, the molar ratio should be between about 1.1/1 and 7/1. The larger the ratio the greater the molecular weight of the polymer, as will be seen below.

PREPARATION OF DPE/HCHO/PhOH

As previously mentioned, the reaction mixture of DPE and HCHO may serve as the reaction medium for the addition of phenol to react with the excess methylol groups. After the phenol has been reacted to form the pendant phenolic groups on the polymer backbone, the polymer is a separate phase and thus can be readily separated by decantation from the residual acid/water/solvent phase. The polymer may then be diluted by a suitable solvent such as ethyl acetate, chloroform, methylene chloride, or toluene, and then washed with an aqueous base such as sodium bicarbonate, to neutralize the residual acids which may be present. Then, the solvent may be stripped, leaving the final resin.

The reaction with phenol may be carried out at temperatures of about 25° C. to 200° C., preferably at about 100° C. Atmospheric pressure is satisfactory but elevated pressures could be used if desired. The reaction may require about 0.5 to 24 hours to complete, depending upon the amounts of the reactants and the conditions selected.

As previously suggested the term "phenol" is used generically herein and substituted phenols of various types may be used. The amount required to completely use the available methylol groups left by the earlier reaction of diphenyl ether with an excess of formaldehyde is used with a small excess, say about 5 percent of the theoretical. Preferably, the mol ratio of phenol to the aromatic moiety will be about 0.1/1 to 6/1.

In the DPE/HCHO/PhOH resin the mol ratio of the components will be about 1/1.1-7/0.1-6, respectively. In particularly preferred embodiments the mol ratios are about 1/2.25/1.25 and 1/3.5/2.5.

CYANATION OF DPE/HCHO/PhOH

The conditions for the cyanation reaction are similar to those suggested for the cyanation of phenolformaldehyde polymers, but selected here to optimize the cyanation of the three-component polymers of the invention. A cyanogen halide, preferably the chloride or bromide, is reacted with the polymers of the invention in the presence of an acid-accepting amine, such as triethylamine. The equivalents of the cyanogen halide, amine, and polymer will be generally within the ranges of 1.5–1.05/1.45–1.0/1.0, respectively. Preferably the equivalents will be about 1.10/1.05/1.0, respectively. Thus, there will be a slight excess of the theoretical amounts of the cyanating agent and the acid accepting amine.

The reactants are combined in the presence of a solvent such as methylene chloride or THF at a low temperature, generally between about −78° C. and −15° C., preferably −30° C. to −40° C. or lower, most preferably about −35° C. The reaction exhibits a large exotherm and thus the mixture is warmed as the reaction proceeds, but the reactor will be cooled so far as possible to moderate the reaction and to limit the formation of by-products.

After the reaction is complete, that is after about 0.5 to 30 minutes, the cyanated product is washed with cold water to remove the ammonium salts which form as by products. The resins may be stripped of the solvent to yield the cyanated resin (APT).

PROPERTIES OF THE APT RESINS

Molecular weight of the APT resins may be adjusted by controlling the amount of formaldehyde relative to the amount of diphenyl ether. Where there is an excess of the formaldehyde, the phenol can crosslink with the oligomer DPE/HCHO and consequently the molecular weight is increased. The following table illustrates the potential range of molecular weights which can be achieved by adjusting the ratios of the three components.

TABLE A

| DPE (mol) | HCHO (mol) | PhOH (mol) | DPE/HCHO/PhOH $M_n^{(1)}$ | $M_w^{(1)}$ | —OH equiv. wt.$^{(2)}$ |
|---|---|---|---|---|---|
| 0.2 | 0.61 | 0.46 | 910 | 17000 | 184 |
| 0.2 | 0.53 | 0.46 | 760 | 4700 | 207 |
| 0.2 | 0.45 | 0.34 | 760 | 5200 | 236 |
| 0.2 | 0.37 | 0.34 | 690 | 2300 | 273 |
| 0.2 | 0.31 | 0.23 | 610 | 1500 | 320 |
| 0.2 | 0.29 | 0.28 | 570 | 4300 | 349 |
| $^{(3)}$1.0 | 2.25 | 1.00 | 454 | 725 | 276 |

$^{(1)}$Number average molecular weight (Mn) and weight average molecular weight (Mw) as measured by gel permeation chromatography using polystyrene standards.
$^{(2)}$Calculated from HNMR measurement of relative amounts of acetate to aromatic protons on samples in which the —OH groups were reacted with acetic anhydride at 100° C.
$^{(3)}$1-Methylnaphthalene replaced DPE and 2-naphthol replaced PhOH for this example.

It may be seen from the above table that the molecular weight of the APT resin is lowered as the excess of formaldehyde is reduced relative to the diphyenyl ether.

The calculated values of molecular weight per hydroxyl group indicate that the number of phenol molecules incorporated decreases as the amount of formaldehyde reacted with diphenyl ether decreases. This reduction in the amount of phenol incorporated has a significant effect on the properties of the APT resin as will be seen below.

The gel time for the cyanated resin increases as the OH equivalent weight decreases. (By resin gel time is meant the time elapsed between placing an aliquot of resin onto a hot plate preheated and maintained at 200° C. and its conversion during curing to a gelled mass.) The energy released during curing decreases as the OH equivalent weight increases. The lower energy release exhibited by the curing of APT resins is advantageous compared to cyanated novolaks. These properties are summarized in the tables below.

Another characteristic of the family of APT resins is the resistance of cured resins to water and solvents as is illustrated in the following table where exposure to boiling water and methylene chloride for periods of 24 and 72 hours, respectively, is reported.

TABLE B

| | Gelation Times of APT Resins | | | | |
|---|---|---|---|---|---|
| OH Eq. Wt. | Mn OH Form | Mw OH Form | Mn OCN Form | Mw OCN Form | Gel Time 200° C.(min) |
| 184 | 910 | 17,000 | 790 | 37,000 | 1.5 |
| 207 | 760 | 4,700 | 760 | 5,700 | 4.5 |
| 236 | 760 | 5,200 | 670 | 5,100 | 7.5 |
| 273 | 690 | 2,300 | 650 | 2,300 | 22 |
| 349 | 570 | 1,300 | 590 | 1,700 | 24 |
| 320 | 610 | 1,500 | 580 | 1,600 | 25 |
| 217 | 1,220 | 1,880 | N/A | N/A | 17 |
| 106* | 2,366 | 3,824 | 1,711 | 4,000 | 7 |
| 276** | 454 | 725 | 513 | 665 | 21 |

*Borden SD1711 Novolak
**1-methylnaphthalene replaced diphenyl ether and 2-naphthol replaced phenol

TABLE C

| DSC CHARACTERIZATION OF APT RESINS | | | |
|---|---|---|---|
| | POLYMERIZATION DATA | | |
| OH Eg. Wt. | Onset Temp, °C. | Peak Temp., °C. | Total Heat J/g |
| 349 | 225 | 289 | 157 |
| 320 | 225 | 286 | 215 |
| 273 | 225 | 284 | 262 |
| 236 | 220 | 282 | 308 |
| 207 | 220 | 279 | 254 |
| 184 | 175 | 270 | 398 |
| 106* | 200 | 261 | 368 |
| 276** | 175 | 260 | 142 |

*Borden SD1711 Novolak
**1-Methylnaphthalene replaced diphenyl ether and 2-naphthol replaced phenol

TABLE D

| SOLVENT RESISTANCE OF CURED APT RESINS | | |
|---|---|---|
| OH Eq. Wt. | Water Absorption, wt. % | MeCl$_2$ Absorption, wt. % |
| 106[1] | 5.2 | 2.5 |
| 184 | 2.5 | 2.0 |
| 207 | 1.5 | 3.0 |
| 236 | 1.3 | 8.0 |
| 273 | 1.0 | 44 |
| 320 | 0.5 | N/A |
| 349 | 0.6 | N/A |

[1]Borden SD1711 Novolak resin

It will be evident that as the molecular weight per hydroxy group increases the methylene chloride absorbed increases, with a dramatic rise above about 207 OH equiv. wt. The water absorption decreases as the Mw/—OH increases and shows a significant advantage over a cyanated Novolak resin.

EXAMPLE 1

Preparation of DPE/HCHO/PhOH Resins

A 250-mL 3-neck flask equipped with a mechanical stirrer and an addition port was charged with diphenyl ether (34 gm, 0.2 mol), acetic acid (35 mL) containing sulfuric acid (5 mL), and aqueous formaldehyde (37% solution, 46 mL, 0.61 mol). The flask was placed in a 100° C. oil bath and rapid mixing was started. After the reaction between the diphenyl ether and formaldehyde had proceeded for 24 hours phenol (40 mL, 0.46 mol) was added in uniform portions over a 15-minute period.

After stirring at 100° C. for 5 hours, the mixture was cooled in an ice-water bath for 60 minutes. Two layers formed. The top aqueous layer was decanted and the lower layer containing the DPE/HCHO/PhOH resin was dissolved in ethyl acetate and then washed twice with 400 mL portions of saturated aqueous sodium bicarbonate and then dried over sodium sulfate. The dried solution was filtered and then evaporated under vacuum to remove the ethyl acetate. The yield of product was found to be 76 gm. HNMR and GPC analyses were performed on the isolated resins.

EXAMPLE 2

Comparative

Reaction of DPE/HCHO/PhOH in Single Step

An apparatus as described in Example 1 was charged with diphenyl ether (0.1 mol), phenol (0.1 mol) and sulfuric acid (0.5 g). The reagents were heated to 80° C. and stirring started. Formaldehyde (13 mL, 0.17 mol) was added dropwise resulting in the rapid formation of a solid product. After the addition was complete, the mixture was heated under reflux for 1 hour. The resulting product was a solid, insoluble mass.

EXAMPLE 3

Comparative

A series of reactions were carried out to study the effects of solvent, temperature, relative amount of HCHO to DPE, and catalyst on the reaction of diphenyl ether and formaldehyde. Generally, the procedure of the first step in Example 1 was followed. The results of the experiments are shown in the Table E.

EXAMPLE 4

Comparative

A series of reactions were carried out to study the effects of the amount of solvent and catalyst and the ratios of the three components of the DPE/HCHO/PhOH resin to establish the preferred mode of carrying out the reactions. The results are given in the Table F.

EXAMPLE 5

Preparation of Naphthalene/HCHO/Naphthol Resins

In a procedure analogous to that described in Example 1, 1-methylnaphthalene (142 g, 1 mol) was condensed with formaldehyde (170 mL, 2.25 mol) in acetic acid solvent (175 mL) using sulfuric acid (25 mL) catalysis. After reacting for 24 hours 2-naphthol (143 g, 1 mol) was added over 7 minutes. The reaction mass was heated under reflux an additional 5 hours and worked up as in Example 1. The results are shown in Table A.

EXAMPLE 6

Preparation of APT Resins

A three-neck 250-mL round bottom flask equipped with a dry ice/acetone cooling bath, a nitrogen atmosphere and a magnetic stirrer was charged with cyanogen bromide (7.4 mL of 5.0M solution, 0.04 mol. 1.15 equivalents) in methylene chloride with a total volume of 50 mL. The solution was cooled to $-75°$ C. and then a solution of the DPE/HCHO/PhOH resin prepared as in Example 1 (0.035 mol of OH, 1.1 equivalents of DPE/HCHO/PHOH and 0.035 mol, 1.1 equivalents of triethylene amine) was added as quickly as possible, but while maintaining the temperature below $-60°$ C. The mixture was stirred for 10 minutes and then the dry ice-acetone bath was removed and the temperature allowed to rise to $-50°$ C. The resulting slurry was poured into 100 mL methylene chloride and then washed three times with 200 mL portions of ice water. Two layers were separated and then the solvent was stripped with vacuum at room temperature. A second portion of methylene chloride was added to the resinous product and the solution stripped again to remove the last traces of water. The APT resin was then recovered by evaporating the methylene chloride under vacuum. The product was yellow-brown in color and about a 95% yield was obtained.

The isolated resins were characterized by GPC analyses and gel time measurements. Gel times were determined using a hot plate equipped with a thermocouple and maintained at 200° C. A small aliquot of resin (ca. 0.5 grams) is placed on the hot plate, and timing is started. The resin is stirred continuously. When the resin becomes a gel, timing is stopped.

TABLE E

| DPE (mol) | HCHO (mol) | Catalyst, (%) | Solvent (mL) | Reaction Time | Reaction Temp (°C.) | Result |
|---|---|---|---|---|---|---|
| 0.15 | 0.125 (HCHO)$_n$ | H$_2$SO$_4$ (3) | none | 18 | 25 | insoluble polymer |
| 0.15 | 0.125 (HCHO)$_n$ | PTSA (4) | none | 18 | 60 | paraform. distills |
| 0.10 | 0.17 (37% aq.) | PTSA (5) | none | 7 | 100 | very slow reaction |
| 0.10 | 0.17 (37% aq.) | oxalic acid (3) | none | 18 | 100 | no reaction |
| 0.20 | 0.34 (37% aq.) | H$_2$SO$_4$ (4) | none | 24 | 100 | partially insoluble |
| 0.20 | 0.34 (37% aq.) | H$_2$SO$_4$ (4) pre-mixed | none | 24 | 100 | oligomer/ unreacted monomer |
| 0.10 | 0.17 (37% aq.) | H$_2$SO$_4$ (10) | acetic acid (25) | 24 | 100 | tractable oligomer |

TABLE F

| DPE (mol) | HCHO (mol) | Acetic Acid (mL) | H$_2$SO$_4$ (mL) | Phenol[1] (mol) | Time (hrs) | Result |
|---|---|---|---|---|---|---|
| 0.2 | 0.61 | 175 | 5 | 0.40 | 28 | insoluble polymer upon phenol addn. |
| 0.2 | 0.61 | 35 | 5 | 0.40 | 28 | soluble copolymer |
| 0.2 | 0.31 | 175 | 5 | 0.23 | 28 | insoluble polymer upon phenol addn. |
| 0.2 | 0.31 | 35 | 5 | 0.23 | 28 | soluble copolymer |
| 0.2 | 0.61 | 35 | 1 | 0.40 | 28 | v. slow reaction |
| 0.2 | 0.31 | 35 | 1 | 0.23 | 28 | v. slow reaction |

[1]The phenol was added the DPE/HCHO condensation had proceeded for 24 hours.

EXAMPLE 7

Comparative Cyanation of Novolak Resin

The cyanation procedure described in Example 5 above was repeated using commercial Borden SD1711 phenol-formaldehyde novolak (OH equivalent weight 106) in place of DPE/HCHO/PhOH resin.

The cyanated novolak resin was characterized as described for APT resins.

EXAMPLE 8

Resin Curing Procedure

APT and cyanated novolak resins were cured according to the following schedule:

| Temperature, °C. | Duration, Hrs. | Observation/Comment |
|---|---|---|
| 115 | 0.5 | Melt resin under N$_2$ |
| 130 | 0.5 | Vacuum degas resin |
| 180 | 20 | Resin curing under N$_2$ |
| 210 | 8 | Resin curing under N$_2$ |
| 260 | 22 | Resin curing under N$_2$ |

No attempt was made to optimize the curing schedule. Shorter curing times could be employed without compromising cured resin performance.

EXAMPLE 9

Determination of Solvent Absorption of Cured Resins

Samples of cured APT and cyanated novolak resins were conditioned by drying under vacuum at 90°-100° C. for 18 hours. Pre-weighed samples of conditioned cured resins were placed into vials filled with deionized water (ca. 15 mL). The vials were then placed into a flowing steam chamber for 24 hours. The samples were removed, blotted dry, and re-weighed. The weight gain was used to calculate percent water uptake.

Samples of cured APT and cyanated novolak resins were conditioned by drying under vacuum at 90°-100° C. for 18 hours. Pre-weighed samples of conditioned cured resins were placed into vials filled with methylene chloride (ca. 15 mL), and the vials were closed. After standing at room temperature for three days, the samples were removed, blotted dry, and reweighed. The weight gain was used to calculate percent methylene chloride uptake.

In the Figure, the results of these water uptake and methylene chloride uptake studies are plotted against resin OH equivalent weight. It can be seen that a broad range of performance properties are accessible within the APT family of resins. These properties are attainable only through the ability to independently vary resin molecular weight and OH equivalent weight. This is in marked contrast to standard phenol-formaldehyde novolak resins, where OH equivalent weight remains the same as resin molecular weight is varied.

We claim:

1. A thermosetting resin defined by the formula

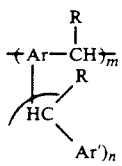

where
R is hydrogen or alkyl having 0-5 carbon atoms
n/m is 0.1 to 6
Ar is

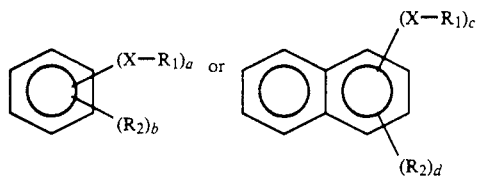

and
X is a sigma bond, O, S, $CH_2$, CO, $SO_2$, $C(CH_3)_2$, or $C(CF_3)_2$ $R_1$ is alkyl, cycloalkyl, phenyl, substituted phenol, naphthyl, or substituted naphthyl
$R_2$ is hydrogen, alkyl, cycloalkyl, phenyl, substituted phenol, naphthyl, or substituted naphthyl a is 1-3
b is 0-3
c is 0-4
d is 0-4
a + b ≦ 4
c + d ≦ 5

Ar' is

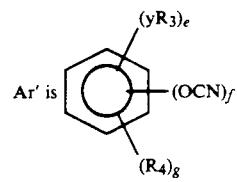

or

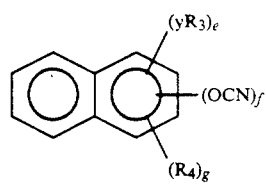

and
y is a sigma bond, $CH_2$, CO, O, S, $SO_2$, $C(CH_3)_2$, or $C(CF_3)_2$
$R_3$ is alkyl, cycloalkyl, phenyl, substituted phenyl, naphthyl, substituted naphthyl, Cl, Br, F, or fluoroalkyl
$R_4$ is hydrogen, alkyl, cycloalkyl, phenyl, substituted phenyl, naphthyl, substituted naphthyl, fluoroalkyl
e is 0-3
f is 1-3
g is 0-3
e+f+g ≦4.

2. The thermosetting resin of claim 1 wherein Ar is derived from diphenyl ether.

3. The thermosetting resin of claim 1 wherein R is H.